Aug. 30, 1966 G. VOGEL ET AL 3,270,144

DIAL SIGNAL RECEIVING FACILITIES

Filed Dec. 1, 1964 2 Sheets-Sheet 2

United States Patent Office 3,270,144

Patented August 30, 1966

3,270,144

DIAL SIGNAL RECEIVING FACILITIES

Georg Vogel, Schwieberdingen, Hilmar Schönemeyer, Ditzingen, and Lorenz Gasser, Gerlingen, Germany, assignors to International Standard Electric Corporation, New York, N.Y., a corporation of Delaware Filed Dec. 1, 1964, Ser. No. 415,052
Claims priority, application Germany, Dec. 4, 1963, St 21,410
6 Claims. (Cl. 179—84)

The invention relates to telephone exchange systems and more particularly to circuit arrangements for the dial pulse receiving facilities in telephone exchanges in which the dial information items are transmitted through voice-frequency code signals within the speech frequency band and in which the code receivers are equipped with speech immunity circuits.

When introducng the voice-frequency key dialing the problem of imparing the speech occurs. Various signaling methods are used to prevent impairing the speech. For example, in one method used, each emitted code signal is accompanied by a key signal. The key signal is used in the central office to switch the code receivers and prepare them for reception.

In another approach, when on the transmitting end, i.e. in the subscriber subset, speech transmission and signal transmission are separated, a safe signalling method can be achieved, when the key signal is formed as a D.C. signal, e.g. reduction or interruption of the loop current. The additional key signal reduces the signal velocity and requires signal translation when retransmitting the signal.

In order to avoid these drawbacks other signalling methods known provide pure voice-frequency signal codes. In order to obtain adequate protection against wrong signals caused by speech, the voice-frequency receivers of the dial pulse receiving facility are equipped with a speech immunity circuit. The speech immunity circuit is designed so that the voice-frequency receiver responds only when the corresponding signal frequency is on the line alone. Since no key signal is available, the receivers must constantly be connected with the line. The speech current circuit is switched when the subscriber station emits a code signal. That is separation between speech and signal transmission is introduced.

Problems with voice frequency key dialing systems using speech immunity circuits arise because of the difficulty in ascertaining when the dial signal is completed so that the dial signal receiving facility in the central office can be switched off. In exchange systems using different length call numbers, the end of the dialing remains unknown to the respective register. To avoid any modification of operation at the subscriber station, the dial signal receiving facility is switched off if after read-out of all dial information items, no new information is transmitted from the subscriber station within a certain time. This means, however, that a connection via the dial signal receiving facility to the extending line must exist at the commencement of a call. The code receivers must constantly be switched on in the dial signal receiving facility. Although speech transmission and signal transmission are separated on the terminating line, the code receivers can now be adversely influenced by the extending line. Moreover, an adverse influence may also be expected by the proceed-to-dial tone, emitted from the dial pulse receiving facility at the commencement of dialing, because said proceed-to-dial tone blocks the code receivers equipped with speech immunity circuit.

With the foregoing in mind it becomes apparent that one of the many objects of the invention is that of providing a new and unique dial actuated voice frequency signal, speech immunity type receiving arrangement.

A more specific object of this invention is to provide a voice frequency dial signal, speech immunity type receiving arrangement having means for preventing the proceed-to-dial tone from interfering with the signal transmission.

A further object of this invention is to provide a voice frequency dial signal, speech immunity type receiving arrangement having a connection at the commencement of the call, through the dial signal receiving facility to the extending line without impairing the signals emitted from the subscriber set.

A still further object of this invention is to provide a system using voice-frequency receivers equipped with speech-immunity circuits wherein no signal is necessary to indicate the completion of dialing.

In accordance with a preferred embodiment of the invention the line arriving from the connecting link leads to a primary two-wire end of a hybrid. On one secondary end of the hybrid the code receivers are connected, and that to the other secondary end of said hybrid the extending line and the dial tone generator can be connected via a gate circuit. After seizing the dial pulse receiving facility and for the entire duration of the proceed-to-dial tone emission, the gate circuit connects the dial tone generator with the hybrid. The gate circuit is blocked when the first code signal arrives. Thereby the code receivers, the dial tone generator and the extending line are disconnected. The control of the gate circuit at the moment a signal is received, according to the invention, prevents any impairing influence on the extending line. Thus, by the arrangement of the circuits, according to the invention, the storage of the dial signal receiving facility blocks the gate circuit and connects the extending line with the hybird circuit only subsequent to a predetermined time after all dial information items were read-out. The dial signal receiving facility is connected so that the line from the connecting link to the hybrid circuit and the line from the gate circuit to the extending line goes through a register switching grid. The gate circuit is controlled so that in a group signal code, the control signal for the gate circuit is tapped at the output of the voice frequency receiver through an OR circuit provided per frequency group and by a succeeding AND circuit.

These and other objects of this invention and the manner of obtaining them will become more apparent, and the invention itself will be best understood by reference to the following description of an embodiment of the invention taken in conjunction with the accompanying drawings, in which.

Figure 1:
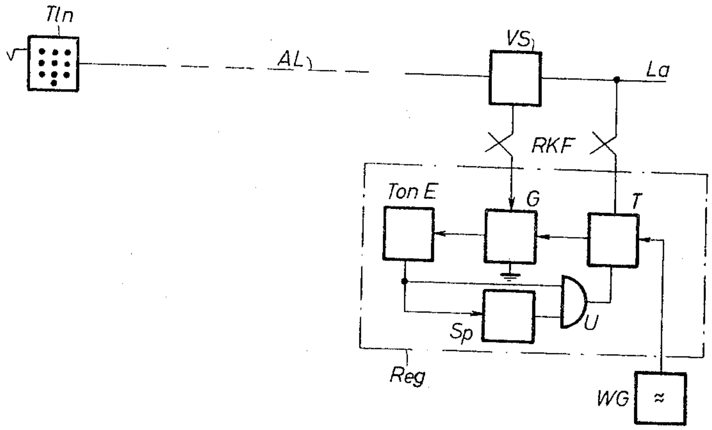
FIG. 1 shows in block diagram form the facilities used in the transmission of the signals.

As demonstrated in FIG. 1, the key dialing subscriber set T*ln* is connected with a link VS after the exchange system has been seized via the subscriber line AL. The connecting link VS requests the dial signal receiving facility register via the register switching grid RKF. The dial signal receiving facility shows a hybrid circuit G, the two-wire end is connected with the line arriving from the link VS. The voice frequency receiver T*on*E are connected on the secondary side of said hybrid. The outputs of the received T*on*E set the storage unit S*p*. At the other secondary end of hybrid G, a gate circuit T is connected which leads to the dial tone generator WG and to the extending line L*a* of the connecting link VS via the register switching grid RKF. The gate circuit T is controlled from the output of the voice frequency receiver T*on*E and the storage S*p* so that, when a code signal is received, the signalling is not impaired by speech at the subscriber set T*ln*.

At the initiation of the connection the gate circuit T is opened so that the proceed-to-dial tone, arriving from the dial tone generator WG via the gate circuit T, the hybrid G, the connecting link VS and the subscriber line AL reaches finally the subset T*lm* of the calling subscriber. The subscriber commences to dial. The hybrid circuit G thereby prevents the proceed-to-dial tone from blocking the voice frequency receivers T*on*E which are equipped with speech immunity circuits. When the output of the voice frequency receiver indicates the reception of a code signal, the dial tone generator is switched off and the gate circuit T blocked. The storage unit S*p* now assumes control of said gate circuit T. The storage unit S*p* stores the code signals received for use in establishing the connection desired. Since no signal is used to indicate the end of dialing, a switch-off device for the dial pulse receiving facility register is provided, controlled by the storage unit S*p*. When the storage S*p* contains no further information and the subscriber Set T*ln* emits no further dial information items after a predetermined time, the gate circuit T becomes unblocked and the calling subscriber is connected with the extending line L*a* via the dial pulse receiving facility R*eg*. The dial pulse receiving facility is switched off in any well known manner after another time delay.

Figure 2:
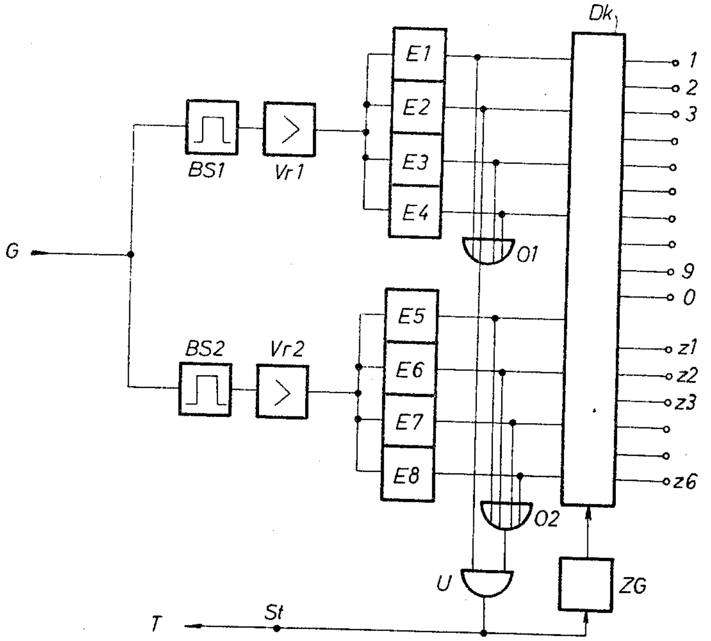
FIG. 2 shows in block diagram form a code receiver for a 2×1-out-of-4 signal code.

FIG. 2 shows a code receiving facility for a 2×1-out-of 4 signal code. The code signals are separated into two groups through two channels starting at one of the secondary outputs of the hybrid circuit G. The signal frequencies *f*1 to *f*4 are led via the first channel with the bandpass filter BS1 and the amplifier V*r*1 to the voice frequency receivers E1 to E4. The bandpass filter BS1 blocks the signal frequencies *f*5 to *f*8, since the speech immunity circuits of the receivers E1 to E4 do not respond upon the second part of the code signal. The signal frequencies *f*5 to *f*8 are led to the voice frequency receivers E5 to E8 through the second channel equipped with the bandpass filter BS2 and the amplifier V*r*2. The bandpass filter BS2 thereby blocks the signal frequencies *f*1 to *f*4. A receiver responds in each receiver group when a code signal is applied. The OR circuit 01 and 02 supervise said signalling condition and the succeeding AND circuit U operates only when both groups are represented in the code signal. At the output S*t* the control signal for the gate circuit T is obtained. The output signal also controls the transfer of the information to the storage unit S*p* via a timing circuit ZG. The signal code can be converted through a decoder D*k* into a 1-out-of-16 code.

Figure 3:
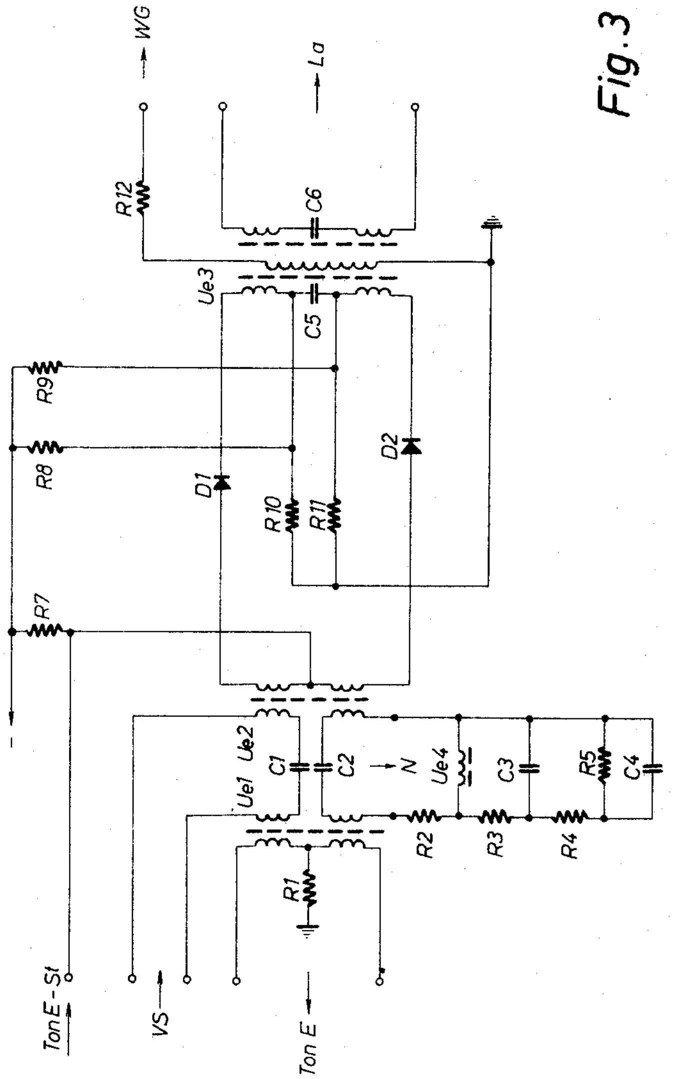
FIG. 3 shows tn exemplary schematic of the hybrid and the gate circuit in the dial signal receiving facility.

FIG. 3 shows the hybrid circuit G and the gate circuit T in detail. The repeating coils or transformers U*e*1 and U*e*2 together with the capacitors C1 and C2 form a highpass hybrid. Thus the hybrid comprises two transformers U*e*1, U*e*2. Each transformer has a two-winding primary and a two-winding secondary. The precision net N is composed of resistors R2, R3, R4, R5, the core U*e*4 and the capacitors C3 and C4. The secondary windings of the transformer U*e*1 represent one secondary (two wires from each secondary winding of transformer U*e*1) output of the hybrid, leading to the code signal receiving facility. The line arriving from the connecting link VS leads to the two-wire input of the hybrid, formed by using one wire from one primary winding of both transformers, and being D.C. blocked by the capacitor C1. The other secondary output leads (two wires from each secondary winding of transformer U*e*2) to another hybrid transformer U*e*3 through the gate circuit formed by the diodes D1 and D2. If no code signal is applied the control output S*t* of the code receiving facility is grounded biasing the diodes D1 and D2 to conduct. The required direct current is furnished by the voltage dividers consisting of the resistors R8, R10 and R9, R11. When a code signal is registered the ground potential is removed from the control output S*t* so that negative potential reaches the diodes D1 and D2 via resistor R7, blocking said diodes.

The repeating coil transformer also forms, together with the capacitors C5 and C6, a highpass filter and is connected to the extending line L*a*, which line is in turn connected to the hybrid only when the gate circuit is not blocked. The repeating coil U*e*3, moreover, bears an additional signal winding leading to the dial tone generator WG through a decoupling resistor R12, so that said generator is also connected to the hybrid only when the gate circuit is not blocked.

The control input S*t* also leads to the storage S*p* which stores the dial information items emitted by the subscriber set. When the calling subscriber ceases to dial the storage unit S*p* controls the gate circuit T. As long as the storage unit S*p* holds information, the control lead ST cannot accept ground potential. This can easily be realized by an AND circuit U, controlled by the output of the code receiver as well as by the storage unit S*p*. Only when both facilities are in a non-operative position can the ground potential become effective to through connect the gate circuit. This is the case at the commencement of dialing and after all dial information items are read-out, so that, on one hand, the proceeding-to-dial tone can be emitted and, on the other hand, after the connection has been established, a speech circuit is closed via the dial pulse receiving facility.

While the principles of the invention have been described above in connection with specific apparatus and applications, it is to be understood that this description is made only by way of example and not as a limitation on the scope of the invention.

We claim:

1. A circuit arrangement using a dial signal receiving facility for receiving voice frequency dial signals originating at subscriber stations, connecting links for connecting said subscriber stations to extending lines through said dial signal receiving facility, said dial signal receiving facility comprising hybrid means having a two wire primary side and first and second secondary sides, switching means responsive to the initiation of a call at one of said subscriber sets for coupling said connecting link to the two wire side of said hybrid, tone receiver means for receiving said dial signals connected to said first secondary side, gate means connected to said second secondary side, dial tone generator means connected to said gate means for transmitting dial tone to the subscriber station initiating a call through said hybrid means responsive to the operation of said switching means, and control means for operating said gate to block said dial tone responsive to the receipt of said dial signals.

2. The circuit arrangement of claim 1 wherein said switching means includes means for connecting said gate means to said extending lines thereby connecting said subscriber set to said extending line through said hybrid.

3. The circuit arrangement of claim 2 wherein said control means comprises storage unit means for storing said received dial signals.

4. The circuit arrangement of claim 3 wherein AND gate means are included in said control means and are operated to block said gate means responsive to dial signals in either said receiver means or in said storage unit means.

5. The circuit arrangement of claim 4 wherein said storage unit includes timing means for maintaining said gate means blocked for a predetermined time after all stored dial signals have been read out.

6. The circuit arrangement of claim 1 wherein said tone receiver means comprises at least a first group of receivers and a second group of receivers, first and second OR gates connected to the outputs of said first and second groups respectively, and AND gate means for providing gate control signals to operate said gate means responsive to signals from said OR gate means.

No references cited.

KATHLEEN H. CLAFFY, *Primary Examiner.*

H. ZELLER, *Assistant Examiner.*